(12) United States Patent
Prouvoyeur et al.

(10) Patent No.: US 9,266,481 B2
(45) Date of Patent: Feb. 23, 2016

(54) METHOD AND DEVICE FOR READING THE STATE OF CONTACT VARIABLES OF A MOTOR VEHICLE

(71) Applicants: Jean-Claude Prouvoyeur, Saint-Jean (FR); Amar Lounnas, Noe (FR); Christophe Pradelles, Fiac (FR)

(72) Inventors: Jean-Claude Prouvoyeur, Saint-Jean (FR); Amar Lounnas, Noe (FR); Christophe Pradelles, Fiac (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/284,732

(22) Filed: May 22, 2014

(65) Prior Publication Data
US 2014/0358364 A1    Dec. 4, 2014

(30) Foreign Application Priority Data

May 30, 2013    (FR) ...................................... 13 54942

(51) Int. Cl.
*B60R 16/023*    (2006.01)

(52) U.S. Cl.
CPC .................... *B60R 16/023* (2013.01)

(58) Field of Classification Search
CPC ....... B60R 16/023; B60R 16/02; H01H 9/167
See application file for complete search history.

(56) References Cited

U.S. PATENT DOCUMENTS

| 6,047,380 A | * | 4/2000 | Nolan | ....................... G06F 1/28 341/141 |
| 8,054,120 B2 | * | 11/2011 | Huber | ................ H03K 19/0016 307/130 |
| 8,717,001 B2 | * | 5/2014 | Bernardon et al. | ........... 323/284 |
| 9,112,721 B2 | * | 8/2015 | Behrens | ................. H04L 12/12 |
| 2003/0090312 A1 | | 5/2003 | Limbrunner | |

FOREIGN PATENT DOCUMENTS

DE    40 15 271 A1    11/1991
EP    1 100 100 A1    5/2001

OTHER PUBLICATIONS

Wanner et al., "Variability-Aware Duty Cycle Scheduling in Long Running Embedded Sensing Systems", Design, Automation and Test in Europe Conference and Exhibition (Mar. 2011), pp. 1-6.*
Bastos et al., "Novel Transient-Fault Detection Circuit Featuring Enhanced Bulk Built-In Current Sensor with Low-Power Sleep-Mode", Microelectronics Reliability 52.9 (2012), pp. 1781-1786.*
FR Search Report, dated Feb. 17, 2014, from corresponding FR application.

* cited by examiner

*Primary Examiner* — Todd Melton
(74) *Attorney, Agent, or Firm* — Young & Thompson

(57) ABSTRACT

A method for reading the state of a plurality of contact variables (Var-1, Var-i, Var-n) of a motor vehicle by a read module (MOD) including a plurality of read ports (P1, Pi, Pn) connected by an electric circuit to the plurality of contact variables, each read port being configured to read the state of a contact variable, the read module being configured to order periodically the reading of the contact, a period including a read interval (Ton) and a sleep interval (Toff), includes a step of detecting a current ($\Sigma_{i=1}^{n} Iinj\_i$) injected via the electric circuit across at least one of the read ports during a sleep interval and a step of adapting the period in which the contact variables are read by the read module, such that the detected current ($\Sigma_{i=1}^{n} Iinj\_i$) injected during a sleep interval is consumed by the read module during the consecutive read interval.

15 Claims, 6 Drawing Sheets

METHOD AND DEVICE FOR READING THE STATE OF CONTACT VARIABLES OF A MOTOR VEHICLE

FIELD OF THE INVENTION

The invention concerns the field of motor vehicles and, in particular, concerns the reading of the state of contact variables of a motor vehicle so as to detect, for example, an open door, an open luggage compartment, the activation of the headlights of the vehicle, etc.

The present invention relates to a method, a module and a device for reading the state of contact variables of a motor vehicle.

BACKGROUND OF THE INVENTION

A motor vehicle usually comprises contact variables, which must be monitored periodically in order to determine the state of the vehicle.

Examples of a contact variable include: a door closing contact, a luggage compartment closing contact, a headlight activation lever contact, a windscreen wiper activation lever contact, etc. A contact variable has two states: an open state and a closed state. To this end, a contact variable is traditionally constituted by a two-state switch, as will be detailed hereinafter.

Usually, the vehicle comprises an electronic read device adapted to monitor the contact variables and to respond in accordance with the states thereof. By way of example, if the luggage compartment of the vehicle is open, the read device can order the activation of a warning light on the dashboard of the vehicle so as to warn the driver.

The read device monitors the state of the contact variables periodically so as to limit its electrical consumption. Read intervals that are alternated with sleep intervals are also distinguished, that is to say a period comprises a read interval and a sleep interval.

The read device, also known to a person skilled in the art by the name ECU or "electronic control unit", usually comprises a read module provided for example in the form of a microcontroller.

The read module comprises a plurality of read ports connected to the contact variables to be monitored. In practice, the contact variables are connected to the read ports by an electric circuit.

In a known embodiment called "low-side input", the electric circuit comprises a supply point connected to a general power source via a switch adapted to be controlled by the read module in such a way that the switch is closed during a read interval and open during a sleep interval. In other words, the switch makes it possible to supply the electric circuit periodically so as to limit the electrical consumption of the read device.

By way of example, FIG. 1 shows a "low-side input" device, in which a read module MOD is connected to a power source Vcc in order to electrically power said module, for example with an electric voltage of approximately 5 volts. In this example, the read module MOD comprises a read port P1 connected to a contact variable Var-1 by an electric circuit CE comprising a supply point A. This supply point is connected to a general power source $S_{GEN}$ via a read switch INT, controlled by the read module MOD, making it possible to electrically connect or disconnect the electric circuit CE to/from the general power source $S_{GEN}$.

By way of example, with reference to FIG. 1, the electric circuit CE comprises:

an injection branch BI, connecting the read port P1 to the contact variable Var-1, comprising an injection resistor Rs1 and a supply branch BA, connecting the contact variable Var-1 to the supply point A, comprising a power supply resistor Rp1.

The read module MOD periodically controls the switch INT so as to close said switch, thus connecting the electric circuit CE to the general power source $S_{GEN}$, as illustrated in FIG. 2. Following the closure of the switch INT, an electric current Iinj-1 is generated in the injection branch BI of the electric circuit CE when the contact variable Var-1 is open. The electric current generated Iinj-1 is received by the read port P1 of the read module MOD. When the contact variable Var-1 is closed, no electric current circulates in the injection branch, the current circulating instead in the supply branch. It is also sufficient to measure the electric voltage of the read port P1 to determine whether the monitored contact variable Var-1 is open or closed.

FIG. 3 shows the monitoring of a plurality of contact variables Var-1, ... Var-i, ... Var-n connected to a plurality of read ports P1, ... Pi, ... Pn. The electric circuit CE makes it possible to connect each contact variable to its read port by an injection branch BI-1, BI-i, BI-n, whereas each contact variable Var-1, Var-i, Var-n is connected to the supply point A of the electric circuit CE by a supply branch BA-1, BA-i, BA-n. As illustrated in FIG. 3, the injection branches BI-1, BI-i, BI-n and the supply branches BA-1, BA-i, BA-n comprise, respectively, an injection resistor Rs1, Rsi, Rsn and a power supply resistor Rp1, Rpi, Rpn.

Similarly to the first example, during a read interval, when the switch INT is closed, an electric current Iinj-1, Iinj-i, Iinj-n is generated in each injection branch BI-1, BI-i, BI-n if the contact variable Var-1, Var-i, Var-n is open. Each electric current generated Iinj-1, Iinj-i, Iinj-n is received by a read port P1, Pi, Pn. The read module MOD can thus determine the state of the contact variables Var-1, Var-i, Var-n.

During a sleep interval, when the switch INT is open, no electric current Iinj is generated in the injection branches BA-1, BA-i, BA-n.

In the case of a wiring fault or malfunction, a short circuit may appear and may connect a contact variable to a battery voltage $A_{BAT}$ of the vehicle as illustrated in FIG. 4. In practice, the battery voltage $A_{BAT}$ is approximately 12 volts.

If the malfunction appears during a sleep interval, the battery voltage $A_{BAT}$ basically performs the same function as the power source $S_{GEN}$ and an electric current Iinj-1, Iinj-i, Iinj-n is thus generated in each injection branch BI-1, BI-i, BI-n if the contact variable Var-1, Var-i, Var-n is open for said injection branch BI-1, BI-i, BI-n. In other words due to the malfunction, the read ports P1, Pi, Pn of the read module MOD receive the electric currents of all the injection branches BI-1, BI-i, BI-n while the read module MOD is in sleep mode.

In practice, the read module MOD is not affected by the sum of received currents ΣInj as long as this sum is less than the value of the current consumed IC by the read module MOD. During a read interval, the electric current Iinj-1, Iinj-i, Iinj-n generated in each injection branch BI-1, BI-i, BI-n via the short circuit is thus less than the current consumed IC by the read module MOD. In other words, the read module MOD consumes the current generated by the short circuit.

A disadvantage appears for last-generation vehicles, of which the read module MOD comprises a mode of use implemented when the vehicle is started, and also a sleep mode implemented when the vehicle is switched off. In sleep, the current consumed IC by the read module MOD is very low. As a result, the sum of received currents ΣInj may exceed the value of the consumed current IC, which affects the power supply of the read module MOD and may lead to damage of the electronic components of the read module MOD.

In order to eliminate this disadvantage, an immediate solution would be to block the electric current received by the read ports of the read module MOD by means of diodes, however the use of additional components complicates the device and leads to additional manufacturing costs.

SUMMARY OF THE INVENTION

So as to eliminate at least some of these disadvantages, the invention relates to a method for reading the state of a plurality of contact variables of a motor vehicle by means of a read module comprising a plurality of read ports connected by an electric circuit to said plurality of contact variables, each read port being configured to read the state of a contact variable, the read module being configured to order periodically the reading of the contact variables, a period comprising a read interval and a sleep interval.

The method is characterized by the fact that it comprises a step of detecting a current injected via the electric circuit across at least one of the read ports during a sleep interval and a step of adapting the period in which the contact variables are read by the read module, such that the detected current injected during a sleep interval is consumed by the read module during the consecutive read interval.

The term "injected current" means a current injected on account of a malfunction, such as a short circuit to a battery of the vehicle.

The method according to the invention makes it possible to activate the read module so that it consumes the injected current so as to avoid the sum of currents circulating in the read module at any given moment from causing damage to the electronic components of the read module. By adapting the read period, the amount of current consumed is adapted so as to prevent this current from exceeding the capacity of the read module. The consumption of the injected current by the read module also makes it possible to avoid the use of additional components, which makes it possible simultaneously to maintain a simple device and to limit the manufacturing costs.

The adaptation step preferably comprises a reduction of the length of the sleep interval so as to limit the amount of current received.

In accordance with an aspect of the invention, the length of the sleep interval is determined on the basis of a predetermined value of the injected current, such that the supply voltage of the read module remains below a predetermined threshold.

The length of the sleep interval is preferably selected so as to be shorter than a determined length Toff_sc_max determined on the basis of the value of the injected current and given by the following formula:

$$\text{Toff\_sc\_max} = \frac{(\mu C \text{ supply max} - Vcc) \times C\_Vcc}{\sum_{i=1}^{n} Iinj_i - I\mu C\_Ip} \quad (1)$$

where μC supply max is the maximum voltage that can be supported by the read module without degradation thereof, Vcc is the supply voltage of the read module, C_Vcc is the supply capacity of the read module, $\sum_{i=1}^{n} Iinj_i$ corresponds to the current injected into the electric circuit during a sleep interval on account of the short circuit caused by a malfunction, and IμC_Ip is the value of the current circulating in the read module during a sleep interval.

The predetermined value of the injected current may be, for example, stored in an internal memory of the read module. It can be determined in a preliminary step on the basis of the value of the battery voltage likely to cause a short circuit and, for example, may be approximately 800 μA for a short circuit with a short-circuit voltage of 12 V. The read module may also store a plurality of predetermined values of the injected current corresponding to a plurality of different malfunctions, such as two short circuits, three short circuits, etc.

The length of a read interval is advantageously determined on the basis of a predetermined value of the injected current so as to reduce the supply voltage of the read module as far as a predetermined supply voltage during said read interval. The read module is designed to start an interval for reading the contact variables when the supply voltage of the read module reaches a predetermined maximum threshold.

The length of the read interval is preferably selected so as to be longer than a minimum length Ton_sc_min, determined on the basis of the value of the injected current and given by the following formula:

$$\text{Ton\_sc\_min} = \frac{(\mu C \text{ supply max} - Vcc) \times C\_Vcc}{I\mu C\_n - \sum_{i=1}^{n} Iinj\_i} \quad (2)$$

where μC supply max is the maximum voltage that can be supported by the read module without degradation thereof, Vcc is the supply voltage of the read module, C_Vcc is the supply capacity of the read module, $\sum_{i=1}^{n} Iinj_i$ corresponds to the current injected into the electric circuit during a sleep interval on account of the short circuit caused by a malfunction, and IμC_n is the value of the current circulating in the read module during a read interval.

In a variant, the length of a read interval and/or of a sleep interval can be determined on the basis of a measured value of the current injected into the circuit, such a measurement possibly being performed by the read module itself or by an external entity, which then sends the measured value to the read module.

The detection step advantageously triggers, preferably instantaneously, an initial read interval referred to as a "wake-up" interval, which makes it possible to start a new cycle with the read period thus adapted. Such a wake-up makes it possible to reduce the sleep interval during which the malfunction is detected so as to ensure that the injected current does not damage the components of the read module during the time in which the read period is adapted.

The invention also relates to a module for reading the state of a plurality of contact variables of a motor vehicle, said read module comprising a plurality of read ports connected by an electric circuit to said plurality of contact variables, each read port being configured so as to read the state of a contact variable, the read module being configured to order periodically the reading of the contact variables, a period comprising a read interval defining a state in which the read module is read and a sleep interval defining a state in which the read module is asleep, the module being characterized in that it comprises means for detecting a current injected via the electric circuit across at least one of the read ports in a sleep state and means for adapting the period in which the contact variables are read by the read module, such that the detected current injected in a sleep state is consumed by the read module in a read state.

At least one of the read ports is preferably configured to detect the injected current.

Even more preferably, the adaptation means are configured to reduce the length of the sleep interval so as to limit the amount of current received.

The adaptation means are advantageously designed to determine a length of the sleep interval shorter than a determined length Toff_sc_max given by the following formula:

$$\text{Toff\_sc\_max} = \frac{(\mu C \text{ supply max} - Vcc) \times C\_Vcc}{\sum_{i=1}^{n} \text{Iinj}_i - I\mu C\_Ip} \quad (1)$$

In accordance with an aspect of the invention, the adaptation means are designed to determine the length of the sleep interval on the basis of a predetermined value of the injected current, such that the supply voltage of the read module remains below a predetermined threshold.

The predetermined value of the injected current may be, for example, stored in an internal memory of the read module. The read module may also store a plurality of predetermined values of the injected current corresponding to a plurality of different malfunctions, such as two short circuits, three short circuits, etc.

The adaptation means are advantageously designed to adapt the length of a read interval so as to reduce the supply voltage of the read module as far as a predetermined supply voltage during said read interval.

The adaptation means are preferably designed to adapt the length of a read interval on the basis of a predetermined value of the injected current.

In accordance with another feature of the invention, the read module is designed to start an interval for reading the contact variables when the supply voltage of the read module reaches a predetermined maximum threshold.

Even more preferably, the adaptation means are designed to determine a length of the read interval greater than a minimum length Ton_sc_min determined on the basis of the value of the injected current and given by the following formula:

$$\text{Ton\_sc\_min} = \frac{(\mu C \text{ supply max} - Vcc) \times C\_Vcc}{I\mu C\_n - \sum_{i=1}^{n} \text{Iinj\_i}} \quad (2)$$

In a variant, the length of a read interval and/or of a sleep interval can be determined on the basis of a measured value of the current injected into the circuit, such a measurement possibly being performed by the read module itself or by an external entity which then sends the measured value to the read module.

The read module is advantageously designed to order a read state in which the state of the variables is read, referred to as a "wake-up" state, after the activation of the detection means, thus making it possible to start a new cycle with the read period thus adapted.

The invention also relates to a device for reading the state of a plurality of contact variables of a motor vehicle, said read device comprising a module for reading said plurality of contact variables, as presented above, and an electric circuit connecting said read module to said plurality of contact variables.

The electric circuit preferably comprises a connection means adapted to be controlled periodically by the read module in accordance with a read state and a sleep state.

The connection means is advantageously provided in the form of a two-position switch.

In accordance with an aspect of the invention, the electric circuit comprises injection branches connecting each contact variable to its associated read port, and supply branches connecting each contact variable to the control point.

In accordance with another aspect of the invention, each injection branch comprises at least one generator of injection current, and each supply branch comprises at least one generator of supply current.

The generator of injection current is advantageously provided in the form of an injection resistor.

It is also advantageous if the generator of supply current is provided in the form of a power supply resistor. When a voltage is applied to the control point of the electric circuit, electric currents are thus generated in the supply and injection branches in accordance with the state of the contact variables.

Thanks to the read device according to the invention, any deterioration of the read module associated with a short circuit of a contact variable is avoided. As a result, the read device has improved reliability, whilst having a small space requirement, limited complexity and a reduced electrical consumption, in particular during the sleep periods of the motor vehicle.

The invention also relates to a motor vehicle comprising a read device as presented above.

Further features and advantages of the invention will emerge from the following description provided with reference to the accompanying figures, which are given by way of non-limiting example and in which identical references denote like objects.

BRIEF DESCRIPTION OF THE DRAWINGS

The invention will be better understood upon reading the following description, given merely by way of example and with reference to the accompanying drawings, in which.

DETAILED DESCRIPTION OF THE INVENTION

Figure 1:
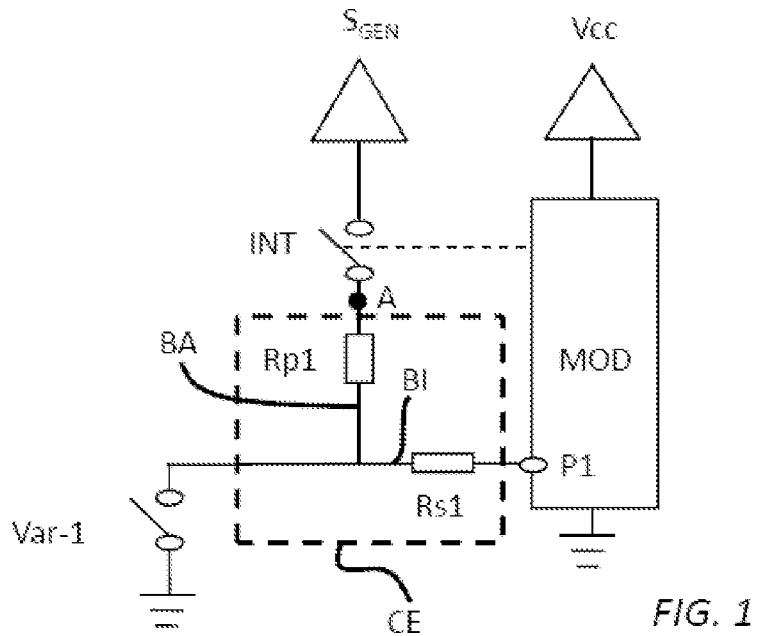
FIG. 1 is a schematic view of a prior art device for reading the state of a single contact variable, during a sleep interval (already discussed)
Figure 2:
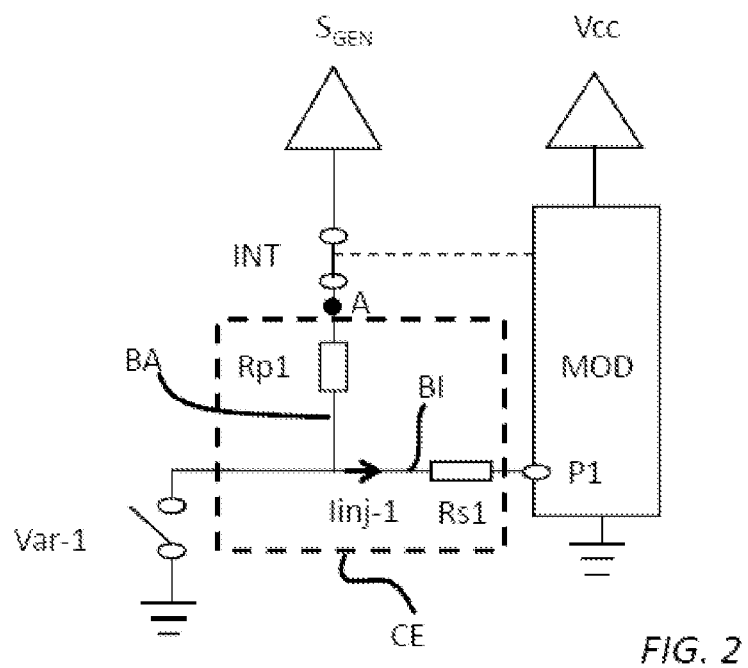
FIG. 2 is a schematic view of the read device of FIG. 1 during a read interval (already discussed)
Figure 3:
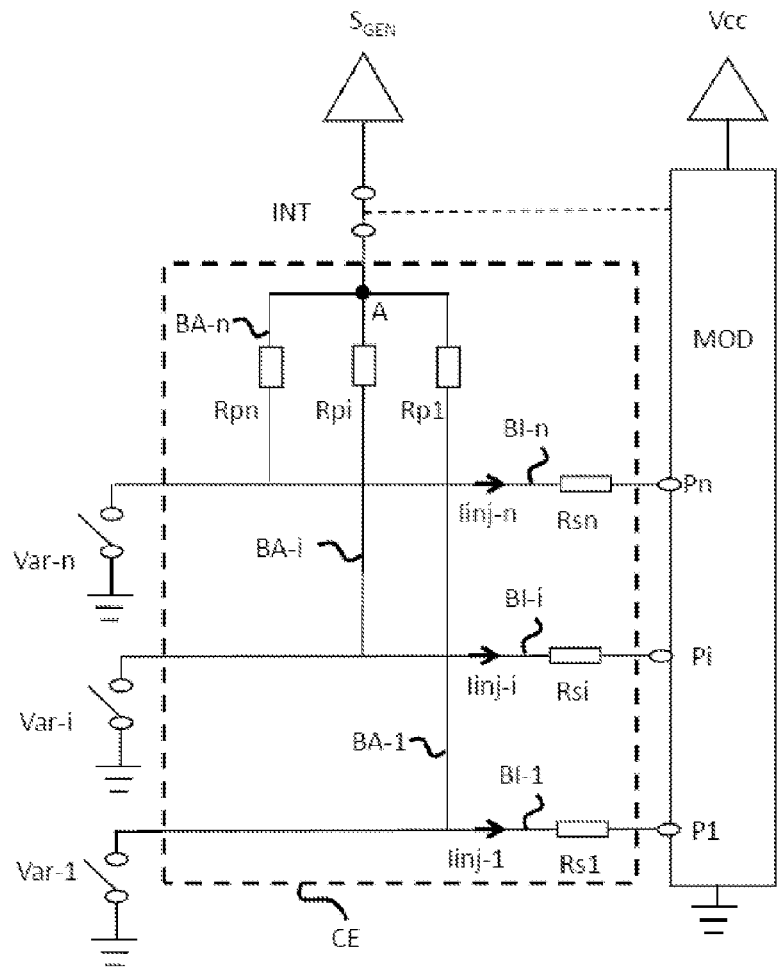
FIG. 3 is a schematic view of a prior art "low-side" input device for reading the state of a plurality of contact variables, during a read interval (already discussed)
Figure 4:
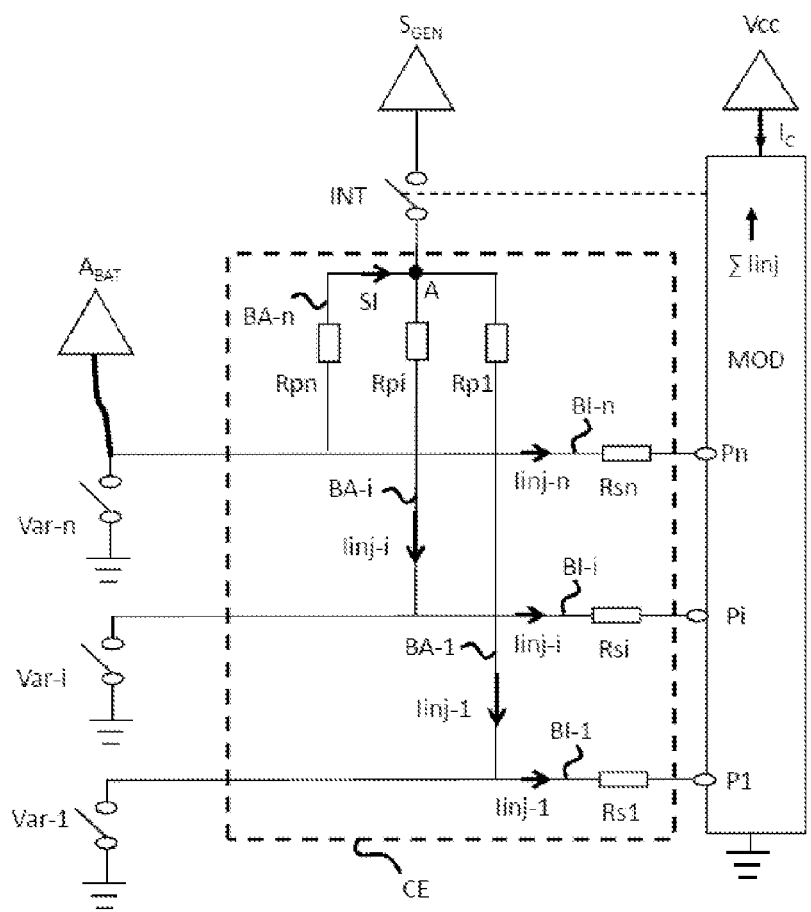
FIG. 4 is a schematic view of the read device of FIG. 3 during a sleep interval in the case of a malfunction (already discussed)
Figure 5:
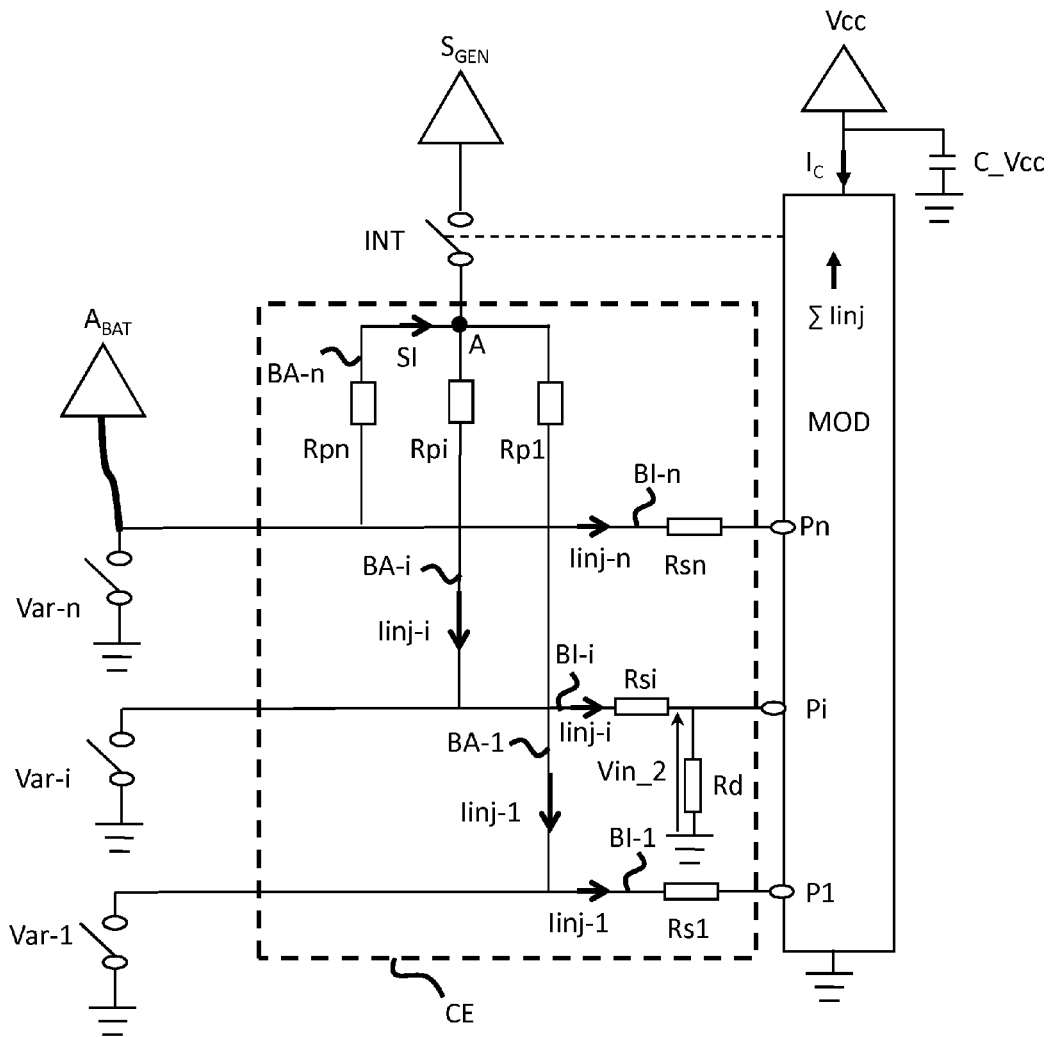
FIG. 5 is a schematic view of a "low-side" input device according to the invention for reading the state of a plurality of contact variables, during a sleep interval in the case of a malfunction.

FIG. 5 shows a device for reading the state of a plurality of contact variables Var-1, Var-i, Var-n of a motor vehicle, such as, for example, a door opening contact or a steering wheel activation contact.

The read device comprises a read module MOD comprising a plurality of read ports P1, Pi, Pn connected by an electric circuit CE to said plurality of contact variables Var-1, Var-i, Var-n. C. Each read port P1, Pi, Pn is designed to read the state of a contact variable Var-1, Var-i, Var-n. The read device is preferably provided in the form of an electronic control unit, and the read module is provided in the form of a microcontroller. Of course, any other electronic logical component could be suitable. In this example, the read module MOD is connected to a power source Vcc and consumes an electric current $I_C$.

Still with reference to FIG. 5, the electric circuit CE comprises a control point A connected to a power source $S_{GEN}$ via a connection means INT adapted to be controlled by the read module MOD. In this example, the power source $S_{GEN}$ is a voltage source, in particular a vehicle battery, supplying a voltage between 8 V and 16 V.

The connection means INT is preferably an electric switch, which is controlled by the read module MOD in accordance with at least two states. In accordance with a preferred embodiment, the connection means INT comprises a combination of electric transistors.

In this embodiment, as illustrated in FIG. 5, the electric circuit CE comprises a plurality of branches connecting the contact variables Var-1, Var-i, Var-n, the read ports P1, Pi, Pn and the supply point A.

In particular, the electric circuit CE comprises injection branches BI-1, BI-i, BI-n connecting each contact variable Var-1, Var-i, Var-n to its associated read port P1, Pi, Pn, and supply branches BA-1, BA-i, BA-n connecting each contact variable Var-1, Var-i, Var-n to the supply point A.

Each injection branch BI-1, BI-i, BI-n preferably comprises at least one generator of injection current, and each supply branch BA-1, BA-i, BA-n preferably comprises at least one generator of supply current.

Each generator of injection current is preferably provided in the form of an injection resistor Rs1, Rsi, Rsn adapted to generate an electric current during application of an electric voltage. Similarly, each generator of supply current is provided in the form of a power supply resistor Rp1, Rpi, Rpn adapted to generate an electric current during application of an electric voltage. Of course, the power supply resistors Rp1, Rpi, Rpn could be provided in the form of a current generation module.

By way of example, each injection resistor Rs1, Rsi, Rsn has a value of approximately 47 kOhms to 100 kOhms, whereas each power supply resistor Rp1, Rpi, Rpn has a value of approximately 1 kOhms to 10 kOhms. For a given contact variable Var-i, the value of the injection resistor Rsi is preferably greater than the value of the power supply resistor Rpi so as to limit the value of the injection current Iinj-i received by the read port Pi.

Depending on the orders of the read module MOD, the connection means INT is configured to electrically connect the supply point A of the electric circuit CE to the power source $S_{GEN}$ during a read interval and to be open during a sleep interval.

In the example illustrated in FIG. 5, a short circuit, for example caused by a wiring fault or a malfunction, connects the contact variable Var-n to a battery voltage $A_{BAT}$ of the vehicle. In practice and by way of example, the battery voltage $A_{BAT}$ is approximately 12 volts, which corresponds to a value of current injected into the electric circuit CE of approximately 800 μA.

In accordance with the invention, the read module MOD comprises means for detecting said current injected via the electric circuit CE across at least one of the read ports P1, Pi, Pn for a sleep state. The term "sleep state" means the state of the read module MOD during a sleep interval, and the term "read state" means the state of the read module MOD during a read interval.

In this example, the detection means comprise the read port Pi of the read module MOD, which is designed, as a switch input, to detect an injected current ΣInj during a sleep interval of the read module MOD. More particularly, the read port Pi detects a fraction of the injected current that it receives and thus detects in extenso that a current has been injected into the electric circuit CE during a sleep interval.

The detection of an injected current ρInj during a sleep interval thus activates the read module MOD so that it adapts its read period.

In this example, the electric circuit CE comprises a detection resistor Rd connected on the one hand to the read port Pi and on the other hand to ground. The detection resistor Rd defines, at the terminals thereof, a voltage Vin-2 that is zero if no current is injected across the read port Pi and not equal to zero when a current is injected across the port Pi during a sleep state. The voltage Vin-2 makes it possible to visualize the injection of a current across the read port Pi.

Still in accordance with the invention, the read module MOD comprises means (not shown) for adapting the period in which the contact variables Var-1, Var-i, Var-n are read by the read module MOD, such that the current injected for a sleep state is consumed by the read module for a read state.

The term "adapt the read period" means determining, on the basis of the value of the injected current ($\Sigma_{i=1}^{n}$Iinj_i), a length of the read interval and/or the length of the sleep interval for which the read module MOD consumes the injected current ($\Sigma_{i=1}^{n}$Iinj_i) due to a malfunction, for example a short circuit connecting at least one contact variable to a power supply battery of the vehicle.

The adaptation means are set up so as to determine a new read period of the read module MOD on the basis of the value of the injected current $\Sigma_{i=1}^{n}$Iinj_i, such that the supply voltage of the read module MOD remains below a predetermined threshold.

In other words, the length of an interval for reading by the read module MOD is determined so as to reduce, during said read interval, the supply voltage Vcc of the read module MOD as far as a predetermined supply voltage Vcc_0 corresponding to a nominal supply voltage of the read module MOD.

In this example, the read interval is determined on the basis of a predetermined value of the current injected in the electric circuit CE by the short-circuit voltage $A_{BAT}$. A value of the injected current, corresponding for example to a "worst case", can be determined on the basis of the value of the short-circuit voltage $A_{BAT}$ and on the basis of the values of the components of the electric circuit CE. In this example, the predetermined value of the injected current is approximately 800 μA.

Again in this example, the adaptation means of the read module determine the period in which the contact variables Var-1, Var-i, Var-n are read, that is to say the length of the read interval and/or the length of the sleep interval for each period, in the following manner:

the length of the read interval is selected so as to be greater than a length Ton_sc_min determined on the basis of the value of the injected current and given by the following formula:

$$\text{Ton\_sc\_min} = \frac{(\mu C \text{ supply max} - Vcc) \times C\_Vcc}{\sum_{i=1}^{n} \text{Iinj}_i - I\mu C\_Ip} \quad (1)$$

where μC supply max is the maximum voltage that can be supported by the read module MOD without degradation thereof, Vcc is the supply voltage of the read module MOD, C_Vcc is the supply capacity of the read module MOD, $\Sigma_{i=1}^{n}\text{Iinj\_i}$ corresponds to the current injected into the circuit CE during a sleep interval Toff_sc on account of the short circuit caused by a malfunction, and IμC_n is the value of the current circulating in the read module MOD during a read interval;

the length of the sleep interval is selected so as to be shorter than a determined length Toff_sc_max, determined on the basis of the value of the injected current and given by the following formula:

$$\text{Toff\_sc\_max} = \frac{(\mu C \text{ supply max} - Vcc) \times C\_Vcc}{I\mu C\_n - \sum_{i=1}^{n} \text{Iinj\_i}} \quad (2)$$

where IμC_Ip is the value of the current circulating in the read module MOD during a sleep interval.

In the case in which several short circuits are detected by the read module MOD, for example by measuring the voltage at the terminal of Vin-2 or by determining the value of the current across the switch input Pi, the read module MOD can select the values of the length of the read interval and of the sleep interval on the basis of values or formulas of Ton_sc_min and of Toff_sc_max stored in a memory, such as, for example, an internal memory (not shown) of the read module MOD.

Figure 6:
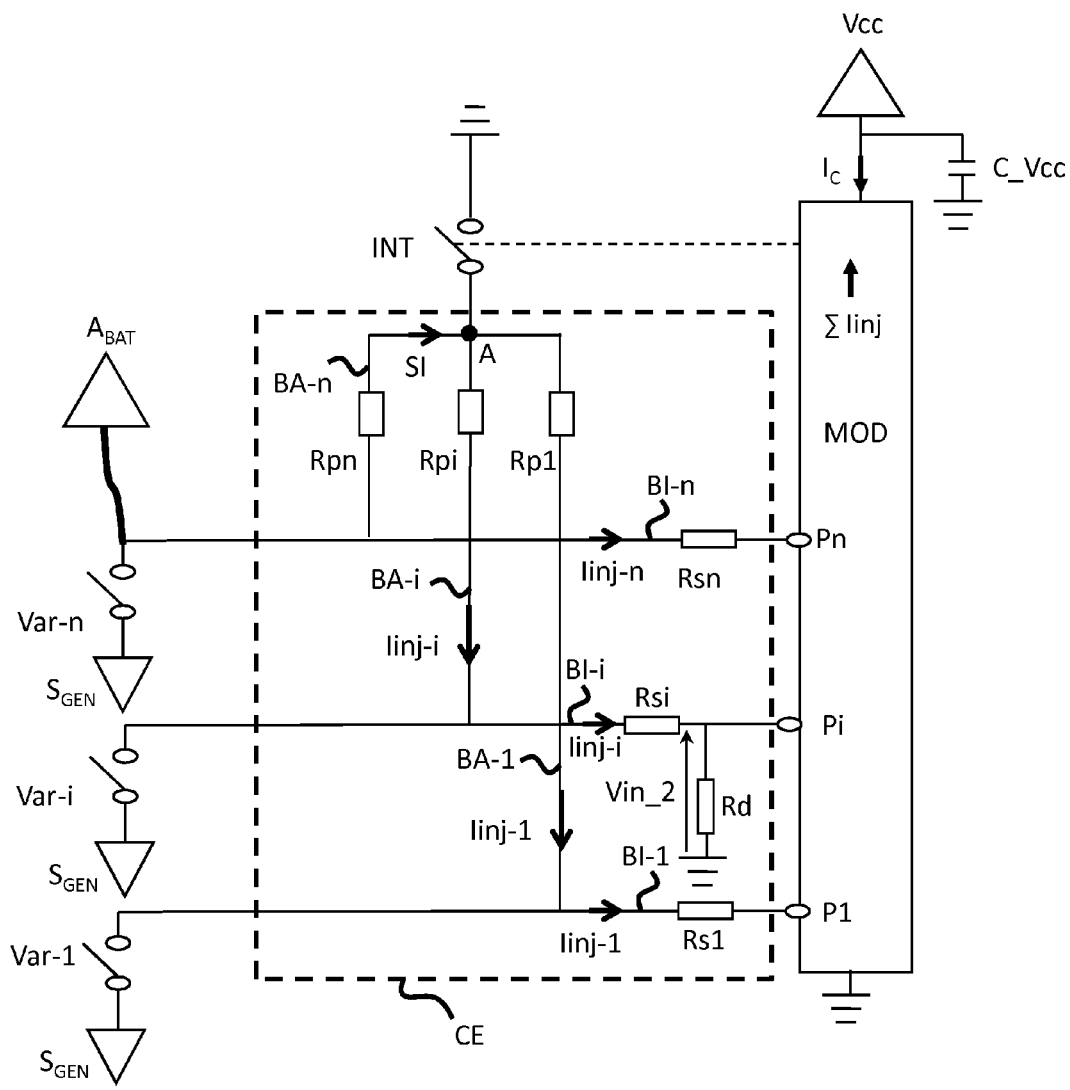
FIG. 6 is a schematic view of a "high-side" input device according to the invention for reading the state of a plurality of contact variables, during a sleep interval in the case of a malfunction.

FIG. 6 illustrates an alternative embodiment of the device according to the invention referred to as a "high-side input" device, in which the control point A is connected to ground via a switch INT adapted to be controlled by the read module MOD in such a way that the switch INT is open during a sleep interval and closed during a read interval.

Each contact variable Var-1, Var-i, Var-n is connected to a supply point connected to a general power source $S_{GEN}$, such that the transfer of a variable Var-1, Var-i, Var-n to the closed state allows the injection of a current into the electric circuit CE. During a read interval, that is to say when the switch INT is closed, the current injected by the contact variable(s) Var-1, Var-i, Var-n that is/are closed is thus routed as far as the corresponding read port P1, Pi, Pn of the read module MOD, which can then detect the closed state of the variable.

Apart from these power supply differences, the other elements of the electric circuit CE are identical to the "low-side" input device illustrated in FIG. 5, as is the read module MOD according to the invention.

In a "high-side" input device, a malfunction could also be caused by a short circuit connecting one or more contact variables Var-1, Var-i, Var-n to a battery voltage $A_{BAT}$ of the vehicle as well as the accidental transfer of one or more contact variables Var-1, Var-i, Var-n to the closed state, thus connecting the contact variables to the general power source $S_{GEN}$.

In other words, in the case of a "high-side" input, if a short circuit occurs at one or more contact variables or if one or more contact variables accidentally switches to the closed state, the power source $S_{GEN}$ or, respectively, the battery voltage $A_{BAT}$, which basically performs the same function as the power source $S_{GEN}$, generates an electric current Iinj-1, Iinj-i, Iinj-n in each injection branch BI-1, BI-i, BI-n while the switch INT is open. In other words, due to the malfunction, the read ports P1, Pi, Pn of the read module MOD receive the electric currents of all injection branches BI-1, BI-i, BI-n while the read module MOD is in sleep mode.

The read module MOD according to the invention makes it possible to detect, via the read port Pi, an injected current during a sleep state of said read module MOD and then to adapt the read period of the module, such that a read interval is sufficiently frequent to prevent the supply voltage of the read module MOD from exceeding a maximum operating voltage μC supply and is sufficiently long to consume the injected current caused by the malfunction and to lower the voltage Vcc of the read module MOD to a predetermined operating value Vcc_0 in the absence of malfunction.

In other words, the current received by the read module MOD as a result of a malfunction is never greater than the maximum operating current of the read module MOD, beyond which the read module risks becoming damaged.

The read device is preferably installed on a motor vehicle so as to read the state of the contact variables and thus warn the driver in the event of malfunction.

When the motor vehicle is asleep, for example is switched off in its parking area, the consumption of the read module MOD is limited. The read module MOD periodically orders the reading of the state of the contact variables so as to be able to warn the driver as soon as the driver wishes to use his vehicle.

Figure 7:
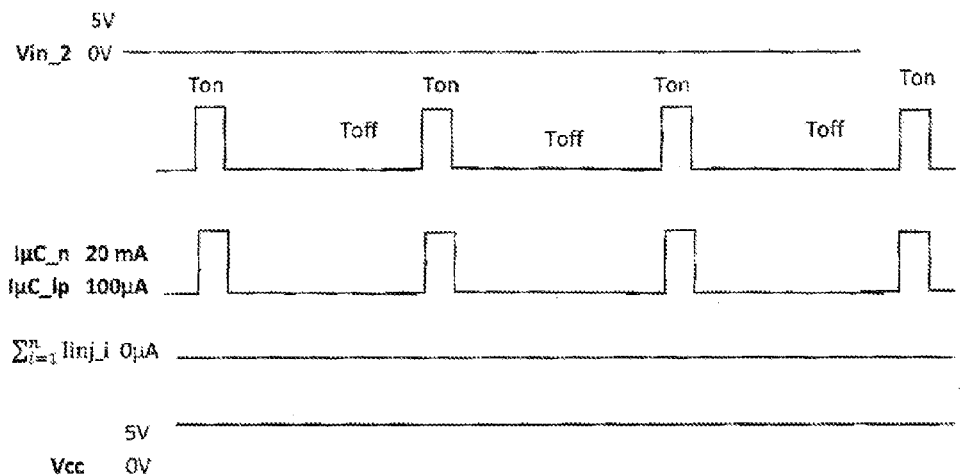
FIG. 7 illustrates an alternation of read intervals and sleep intervals in the absence of malfunction.

As illustrated in FIG. 7, the periodic order by the read module MOD is illustrated by a plurality of read intervals Ton alternated with a plurality of sleep intervals Toff.

In this example, the value of the current IμC_n circulating in the read module MOD during a read interval is approximately 20 mA, and the value of the current IμC_Ip circulating in the read module MOD during a sleep interval is approximately 100 μA.

Still with reference to FIG. 7, in the absence of malfunction, such as a short circuit of one or more contact variables Var-1, Var-i, Var-n to a battery voltage $A_{BAT}$ of the vehicle or the accidental transfer of one or more contact variables Var-1, Var-i, Var-n to the closed state in the case of a "high-side" input read device, no current is injected into the electric circuit ($\Sigma_{i=1}^{n}\text{Iinj\_i}=0$). In this case, the voltage Vin_2 at the terminals of the detection resistor Rd is zero and the supply voltage of the read module MOD is constant (equal to 5 volts in this example).

Figure 8:
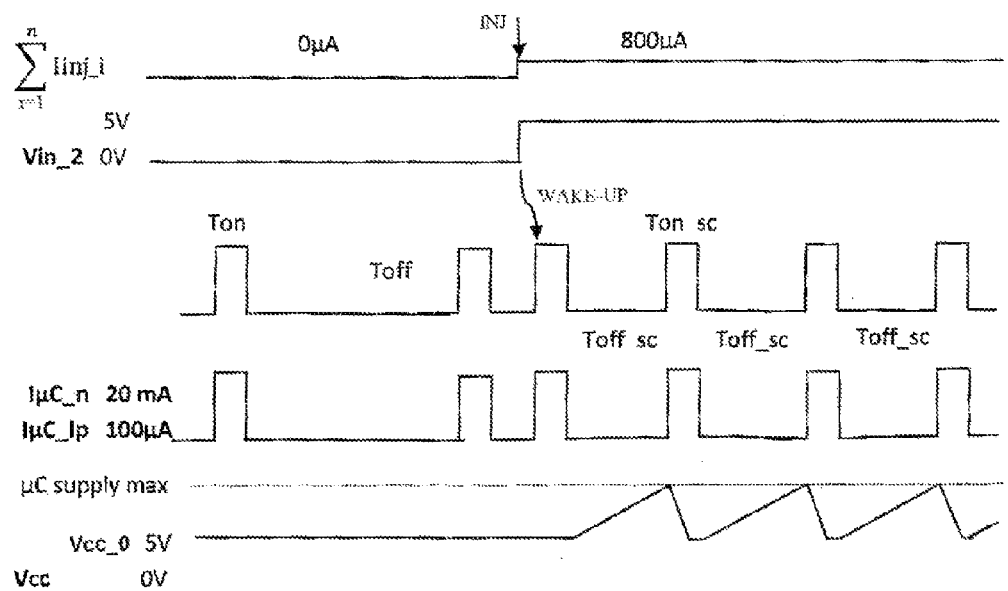
FIG. 8 illustrates an alternation of read intervals and sleep intervals in the presence of a malfunction.

If a malfunction INJ occurs during a sleep interval, as illustrated in FIG. 8, a current $\Sigma_{i=1}^{n}\text{Iinj\_i}=800$ μA is injected into the electric circuit CE and is detected by the read port Pi (with reference to FIGS. 5 and 6).

The read module MOD then adapts the read period, that is to say the length of the read intervals Ton_sc and the sleep intervals Toff_sc, on the basis of the above-mentioned equations (1) and (2), such that the injected current $\Sigma_{i=1}^{n}\text{Iinj\_i}$ is consumed by the read module MOD with each read state, that is to say during each read interval Ton_sc.

In this example, following the detection of the injected current $\Sigma_{i=1}^{n}\text{Iinj\_i}$ by the read port Pi, the read module MOD orders (WAKE UP) a read state in which the state of the variables Var-1, Var-i, Var-n is read, thus making it possible to start a new cycle with the read period thus adapted.

As illustrated in FIG. 8, the injected current $\Sigma_{i=1}^{n}\text{Iinj\_i}$ causes the supply voltage Vcc of the read module MOD to rise during a sleep interval as far as the maximum voltage value μC supply max, then the read module orders a read state during a read interval Ton_sc, which makes it possible to lower the supply voltage Vcc to be referenced nominal value thereof of 5 V. In this example, the adaptation makes it possible to reduce the length of the sleep intervals Toff_sc so as to limit the amount of current received.

The invention has been presented for protection against the risks of short circuit to a battery voltage, however it of course enables protection for any type of short circuit, in particular greater than Vcc.

The invention claimed is:

1. A method for reading the state for a plurality of contact variables of a motor vehicle by a read module including a plurality of read ports connected by an electric circuit to said plurality of contact variables, each read port being configured to read the state of a contact variable, the read module being configured to order periodically the reading of the contact variables, a period including a read interval and a sleep interval, the method comprising:
    detecting a current ($\Sigma_{i=1}^{n}$Iind_t) injected via the electric circuit across at least one of the read ports during a sleep interval; and
    adapting the period in which the contact variables are read by the read module, such that the detected current ($\Sigma_{i=1}^{n}$Iinj_i) injected during a sleep interval is consumed by the read module during the consecutive read interval.

2. The read method according to claim 1, wherein the adapting comprises reducing the length of the sleep interval to limit the amount of current ($\Sigma_{i=1}^{n}$Iinj_i) received.

3. The read method according to claim 2, wherein the length of the sleep interval is determined on the basis of a predetermined value of the injected current ($\Sigma_{i=1}^{n}$Iinj_i), such that the supply voltage of the read module remains below a predetermined threshold.

4. The read method according to claim 1, wherein the length of the sleep interval is determined on the basis of a predetermined value of the injected current ($\Sigma_{i=1}^{n}$Iinj_i), such that the supply voltage of the read module remains below a predetermined threshold.

5. The read method according to claim 4, wherein the length of the sleep interval is selected to be shorter than a determined length Toff_sc_max determined on the basis of the value of the injected current and given by the following formula:

$$\text{Toff\_sc\_max} = \frac{(\mu C \text{ supply max} - Vcc) \times C\_Vcc}{\sum_{i=1}^{n} Iinj_i - I\mu C\_Ip}$$

where I$\mu$C_Ip is the value of the current circulating in the read module during a sleep interval, and C_Vcc is the supply capacity of the read module.

6. The read method according to claim 5, wherein the length of a read interval is determined on the basis of a predetermined value of the injected current ($\Sigma_{i=1}^{n}$Iinj_i) so as to reduce the supply voltage of the read module as far as a predetermined supply voltage during said read interval.

7. The read method according to claim 6, wherein the length of the read interval is selected so as to be longer than a minimum length Ton_sc_min, determined on the basis of the value of the injected current and given by the following formula:

$$\text{Ton\_sc\_min} = \frac{(\mu C \text{ supply max} - Vcc) \times C\_Vcc}{I\mu C\_n - \sum_{i=1}^{n} Iinj\_i}$$

where $\mu$C supply max is the maximum voltage that can be supported by the read module without degradation thereof, Vcc is the supply voltage of the read module, C_Vcc is the supply capacity of the read module, corresponding to the current injected into the circuit during a sleep interval on account of the short circuit caused by a malfunction, and I$\mu$C_n is the value of the current circulating in the read module during a read interval.

8. A module configured to read the state of a plurality of contact variables of a motor vehicle, said read module comprising:
    a plurality of read ports connected by an electric circuit to said plurality of contact variables, each read port being configured so as to read the state of a contact variable, the read module being configured to order periodically the reading of the contact variables, a period including a read state and a sleep state of the read module;
    means for detecting a current ($\Sigma_{i=1}^{n}$Iinj_i) injected via the electric circuit across at least one of the read ports in a sleep state; and
    means for adapting the period in which the contact variables are read by the read module, such that the detected current ($\Sigma_{i=1}^{n}$Iinj_i) injected in a sleep state is consumed by the read module in a read state.

9. The read module according to claim 8, wherein at least one of the read ports is configured to detect the injected current ($\Sigma_{i=1}^{n}$Iinj_i).

10. The read module according to claim 9, wherein the adaptation means is configured to adapt the length of a read interval on the basis of a predetermined value of the injected current ($\Sigma_{i=1}^{n}$Iinj_i) so as to reduce the supply voltage of the read module as far as a predetermined supply voltage during said read interval.

11. A device for reading a plurality of contact variables of a motor vehicle, said read device comprising:
    the module configured to read said plurality of contact variables according to claim 9; and
    an electric circuit connecting said read module to said plurality of contact variables.

12. The read module according to claim 8, wherein the adaptation means is configured to adapt the length of a read interval on the basis of a predetermined value of the injected current ($\Sigma_{i=1}^{n}$Iinj_i) so as to reduce the supply voltage of the read module as far as a predetermined supply voltage during said read interval.

13. A device for reading a plurality of contact variables of a motor vehicle, said read device comprising:
    the module configured to read said plurality of contact variables according to claim 12; and
    an electric circuit connecting said read module to said plurality of contact variables.

14. A device for reading a plurality of contact variables of a motor vehicle, said read device comprising:
    the module configured to read said plurality of contact variables according to claim 8; and
    an electric circuit connecting said read module to said plurality of contact variables.

15. A module configured to read the state of a plurality of contact variables of a motor vehicle, said read module comprising:

a plurality of read ports connected by an electric circuit to said plurality of contact variables, each read port being configured so as to read the state of a contact variable, the read module being configured to order periodically the reading of the contact variables, a period including a read state and a sleep state of the read module;

a current detector configured to detect a current ($\Sigma_{i=1}^{n}$Iinj_i) injected via the electric circuit across at least one of the read ports in a sleep state; and a processor configured to adapt the period in which the contact variables are read by the read module, such that the detected current ($\Sigma_{i=1}^{n}$Iinj_i) injected in a sleep state is consumed by the read module in a read state.

* * * * *

UNITED STATES PATENT AND TRADEMARK OFFICE
CERTIFICATE OF CORRECTION

PATENT NO. : 9,266,481 B2
APPLICATION NO. : 14/284732
DATED : February 23, 2016
INVENTOR(S) : Jean-Claude Prouvoyeur et al.

Page 1 of 1

It is certified that error appears in the above-identified patent and that said Letters Patent is hereby corrected as shown below:

In the Claims

In Column 11, line 21, the formula should read:

-- $\left( \sum_{i=1}^{n} Iinj\_i \right)$ --

Signed and Sealed this
Fourteenth Day of June, 2016

Michelle K. Lee
*Director of the United States Patent and Trademark Office*